United States Patent [19]

Haber et al.

[11] Patent Number: 5,458,295
[45] Date of Patent: Oct. 17, 1995

[54] DUAL CHAMBER COFFEE MILL

[76] Inventors: Barry M. Haber, 17 Bobwhite Dr., Westport, Conn. 06880; Ma K. Ming, 2 Tung San Square, Tai To, N. T., Hong Kong

[21] Appl. No.: 299,951

[22] Filed: Sep. 2, 1994

[51] Int. Cl.⁶ .......................... B02C 19/12; B02C 23/02
[52] U.S. Cl. ..................... 241/100; 241/222; 241/224
[58] Field of Search .................... 241/100, 222, 241/225, 224

[56] References Cited

U.S. PATENT DOCUMENTS

| | | |
|---|---|---|
| Re. 34,382 | 9/1993 | Newnan . |
| 2,019,013 | 10/1935 | Kopf . |
| 2,077,980 | 4/1937 | Bell . |
| 3,182,919 | 5/1965 | Geerlings . |
| 3,497,109 | 2/1970 | Leach . |
| 4,688,474 | 8/1987 | Anderl . |
| 4,779,521 | 10/1988 | Brumfield . |
| 4,789,106 | 12/1988 | Weber . |
| 4,815,633 | 3/1989 | Kondo . |
| 4,955,510 | 9/1990 | Newnan . |
| 4,971,259 | 11/1990 | Nidiffer . |
| 5,123,572 | 6/1992 | Ford . |
| 5,193,438 | 3/1993 | Courtois . |
| 5,241,898 | 9/1993 | Newnan ........................ 99/280 |

FOREIGN PATENT DOCUMENTS 509864  10/1930  Germany .

Primary Examiner—Irene Cuda
Assistant Examiner—John M. Husar
Attorney, Agent, or Firm—Haynes N. Johnson

[57] ABSTRACT

A coffee mill with two bins for holding two types of coffee. The bins slope downwardly and inwardly to provide two adjacent bin outlets. These outlets feed into the entrance to a coffee grinder. A slider plate and a baffle plate are slidingly mounted between the outlets and the entrance, and can be used to close the outlets altogether or to partially or entirely close all of one outlet, leaving the other outlet open. The slider plate removably interfits with the baffle plate so that moving the baffle plate causes both plates to slide together, in order to determine the coffee mix. When the two plates are in the position in which the slider plate covers both bin outlets, the slider plate fits within and is carried by a supporting frame proximate to the outlets. As a result, the bin and the slider plate can be lifted, and the slider plate will seal the bin outlets and prevent spillage of the coffee beans remaining in the bins. The baffle plate separates from the slider plate at this time and remains in position over the grinder entrance, closing it.

10 Claims, 4 Drawing Sheets

DUAL CHAMBER COFFEE MILL

FIELD OF THE INVENTION

This invention relates to a domestic coffee mill used to mix and grind coffee beans just prior to use, and, in particular, to one which can mix different coffee beans in desired proportions, and to one in which the coffee bean bins can be sealed so that they can be removed from the grinder without the beans spilling from their bins.

BACKGROUND OF THE INVENTION

Various mills exist for grinding coffee beans. They are primarily for commercial uses, and have complex systems for proportioning coffee bean mixture; and they are not designed for easy cleaning. The present invention overcomes these deficiencies by providing for a simple mixture control which also serves to close the coffee bin outlets so that the bins can be readily removed from the coffee mill.

BRIEF SUMMARY OF THE INVENTION

This coffee mill contains two bins which can hold two different types of coffee beans. The two bins slope downwardly and inwardly to provide two bin outlets, adjacent to one another. These outlets feed into the entrance to the coffee grinder itself. A slider plate is slidingly mounted between the outlets and the grinder entrance, and can be used to close the outlets altogether or to partially or entirely close all of one outlet. A baffle plate carrying the slider plate is slidingly mounted on the top of the grinder entrance and has a hole in it which can permit coffee beans to flow from both bins or to close the outlet on the other of the bins. The slider plate removably interfits with the baffle plate so that moving the baffle plate serves to slide both plates together, in order to determine the coffee mix.

When the two plates are in the position in which the slider plate covers both bin outlets, the slider plate fits within and is carried by a supporting frame proximate to the outlets. As a result, the bin and the slider plate can be lifted, and the slider plate will seal the bin outlets and prevent spillage of any coffee beans remaining in the bins. The baffle plate separates from the slider plate at that time and remains in position over the grinder entrance, closing it. Thus, convenient access to the grinder portion of the unit is obtained, for cleaning or maintenance.

DETAILED DESCRIPTION OF THE INVENTION

Figure 1:
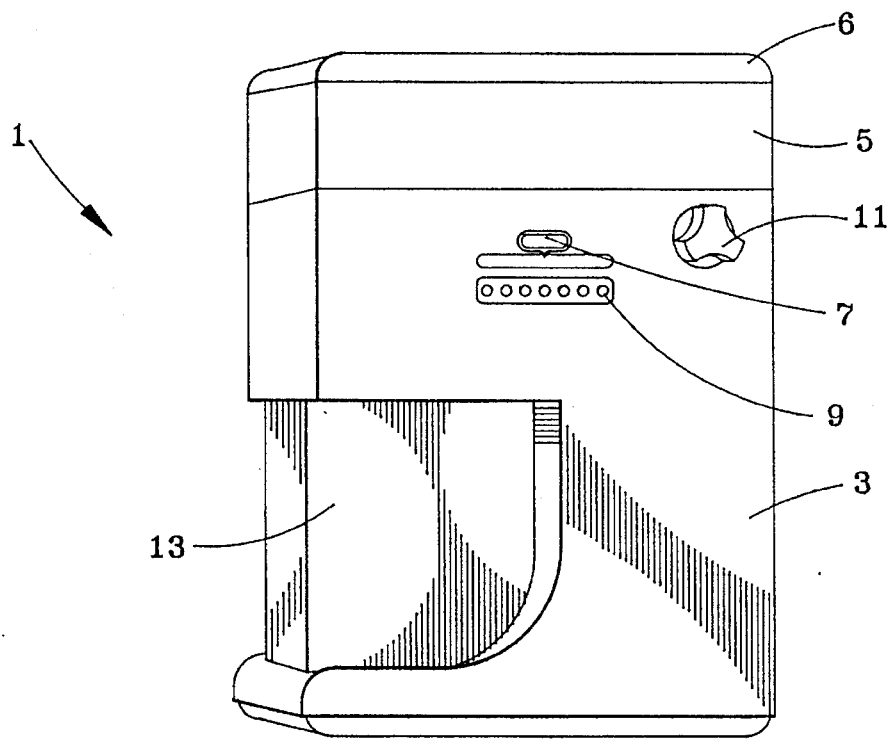
FIG. 1 is a perspective view of our coffee mill, which has coffee beans in two bins inside the upper housing. It shows a control panel on the lower housing.

Our coffee mill 1 is shown in FIG. 1. It includes lower housing 3, upper housing 5, removable top 6, and a receiving container for ground coffee 13. One side of lower housing 3 carries blend control arm 7, grind control 9, and quantity control knob 11. Our invention is directed to the blending of coffee beans in different proportions before grinding, however, not to the grinding itself. Any customary grinder can be used.

Figure 2:
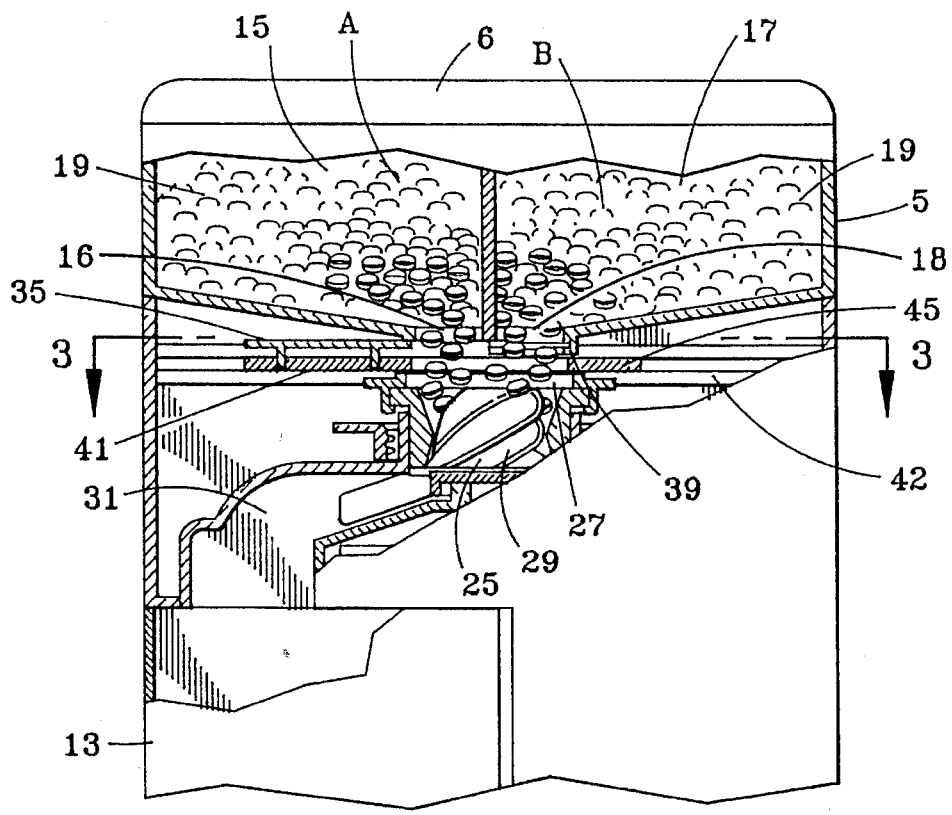
FIG. 2 is a side elevation, partially broken away and partially in section, showing the coffee bean bins and the system for control of bean flow. The slider plate and baffle plate are in a position such that coffee beans flow equally from both bins.

Two coffee bean bins 15 and 17 (bins "A" and "B", respectively) hold the coffee beans 19 (see FIG. 2). The bins are carried by the upper housing 5, which, itself, forms part of their structure. Both bins have sloping bottoms, sloping toward the center; and there are adjacent outlets, one at the bottom of each bin, outlet 16 for bin 15, and outlet 18 for bin 17. Preferably, outlets 16 and 18 are of the same size.

Grinder 25 has a grinding auger 29 which grinds coffee beans and feeds them to a spillway 31 for ground coffee, the spillway leading to receiving container 13. Grinder 25 has an upper entrance opening 27 for receiving coffee beans; and bin outlets 16 and 18 feed into entrance opening 27. The bin outlets together have a shape and size corresponding to that of the entrance opening 27. Thus, coffee beans can pour from outlets 16 and 18 into entrance opening 27.

A slider plate 35 and a baffle plate 41 are positioned between the outlets 16 and 18 and the entrance opening 27; They are mounted for horizontal sliding movement from side to side relative to the two coffee bins (i.e., fore and aft as seen in FIG. 1; and from left to right and right to left as seen in FIGS. 2, 4, 5, 6, and 7). Baffle plate 41 slides in cradle support 42 which has guides 45. Slider plate 35 is carried by baffle plate 41, and slides with it. Sliding is controlled by control arm 7 which extends from the baffle plate.

Figure 3:
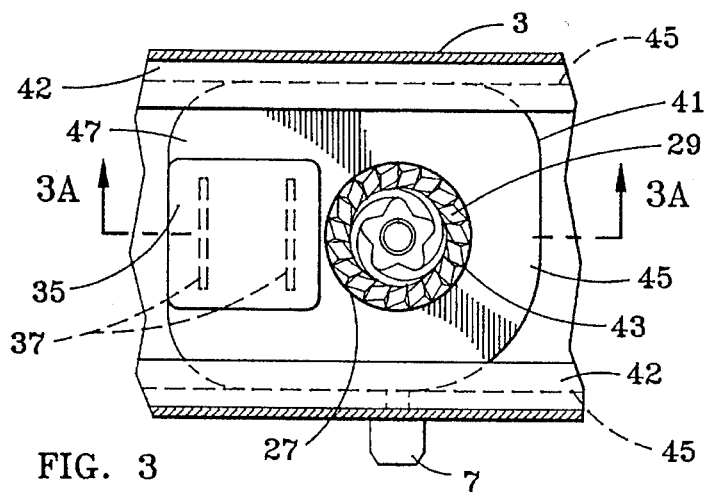
FIG. 3 is horizontal section, taken on line 3—3 of FIG. 2, showing the support for the baffle plate and the interrelationship among the baffle plate, the slider plate, and the entrance opening to the grinder.
Figure 3A:
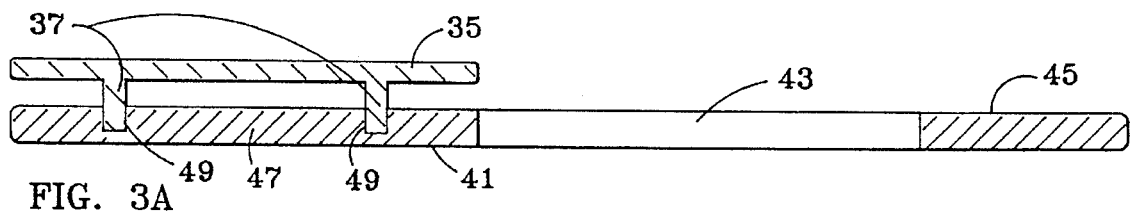
FIG. 3A is a section, taken on line 3A—3A of FIG. 3, showing the parts of the slider plate and of the baffle plate, and how they are releasably interengagable.

Slider plate 35 is large enough to cover and, so, close both bin outlets 16 and 18 when it is over them. When the slider plate is in this closed position, it fits within and can be carried by slider plate support frame 39, mounted just below and around outlet 18. Slider plate 35 carries two downwardly extending tabs or ridges 37 (which are transverse to the direction of sliding). These tabs 37 removably fit within corresponding grooves or slots 49 on the upper surface of the baffle plate 41 (See FIGS. 3 and 3A). Thus, when the slider plate tabs 37 are fitted into the slots 49, the slider plate and the baffle plate slide together as a unit. Alternatively, the tabs can be on the baffle plate and the slots on the slider plate. As will be described below, however, the slider plate separates from the baffle plate when the upper housing 5 (with coffee bins 15 and 17) is lifted from the lower housing 3.

The baffle plate fits over the grinder entrance opening 27, and is slidingly held by cradle support 42. It has an opening in it commensurate with the two openings 16 and 18 and commensurate with entrance opening 27. To the right of the opening (as seen in FIGS. 2, and 4 to 8), it has a gate portion 45, for blocking coffee bean flow; and, to the left, it has a slide plate support portion, with slots 49 to receive slider plate tabs 37. Blend control arm 7 extends from the baffle plate 41 through the side of the lower housing 3, for adjustment of mix proportion.

In use, top 6 is removed from upper housing 5, and different kinds of coffee beans are put into bins A and B. The desired mix proportion is set by sliding blend control arm 7, which moves baffle plate 41 and slider plate 35 together. Some of the various mix proportions to which these plates can be set are shown in FIGS. 2, 4, 5, and 6.

In FIG. 2, the plates are positioned such that slider plate 35 does not block either of the outlets 16 and 18; and baffle plate 41 is set so that its opening 43 is under the openings. Equal proportions of each type of bean can then flow through the outlets and into grinder entrance opening 27.

Figure 4:
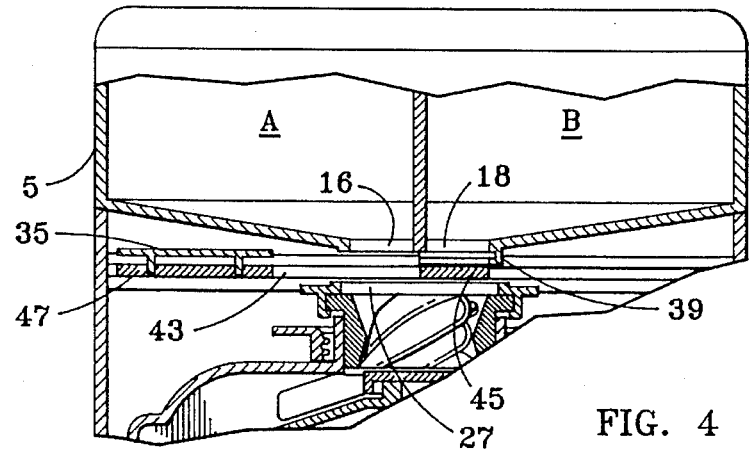
FIG. 4 is a portion of FIG. 2 showing the slider and baffle plates in the position which allows coffee beans to flow only from bin "A" (the left-hand bin).

In FIG. 4, the plates have been moved to the left. Now slider plate 35 is not blocking either outlet 16 or 18; and baffle plate opening 43 is only below outlet 16, with its gate portion 45 blocking outlet 18. Now the mix will consist solely of beans from bin B.

Figure 5:
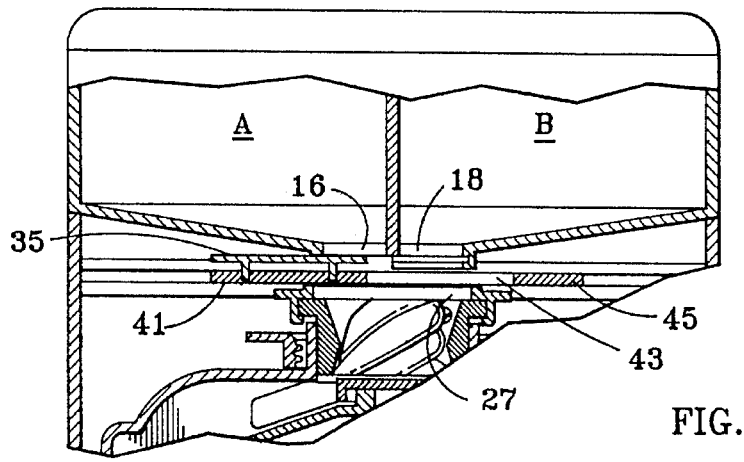
FIG. 5 is similar to FIG. 4, but the slider and baffle plates are positioned so that the ratio of coffee beans from bin "A" to coffee beans from bin "B" (the right-hand bin) is about 1:3.

In FIG. 5, the slider plate 35 is blocking about two-thirds of outlet 16 (as is slider plate support 47 of baffle plate 41); and nothing is blocking outlet 18. The resulting proportion will be for a ratio of about 1:3 between beans from bin A and beans from bin B.

Figure 6:
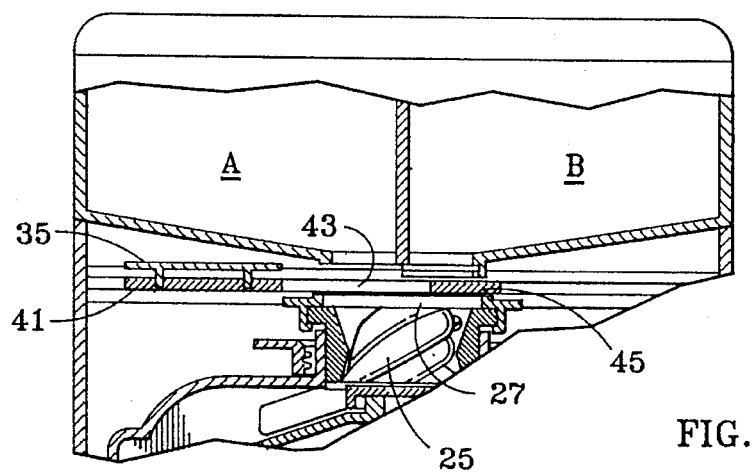
FIG. 6 is similar to FIG. 5, but here the slider and baffle plates are set such that the ratio of "A" coffee beans to "B" coffee beans is reversed, being about 3:1.
Figure 7:
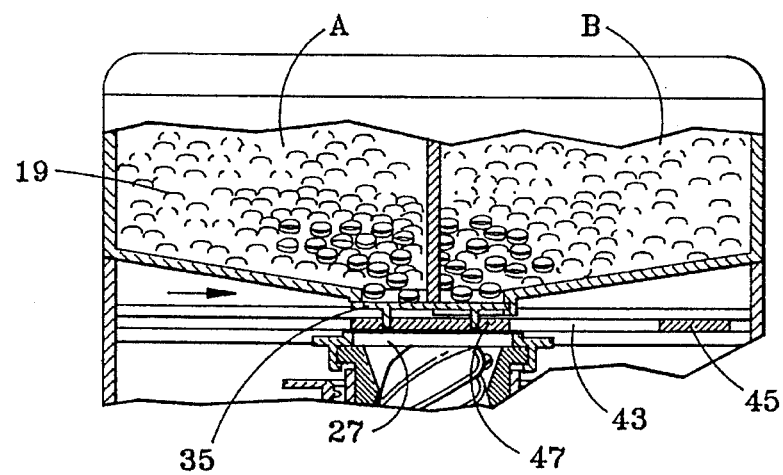
FIG. 7 is similar to FIGS. 4 to 6, but shows the outlets of both bins closed.
Figure 8:
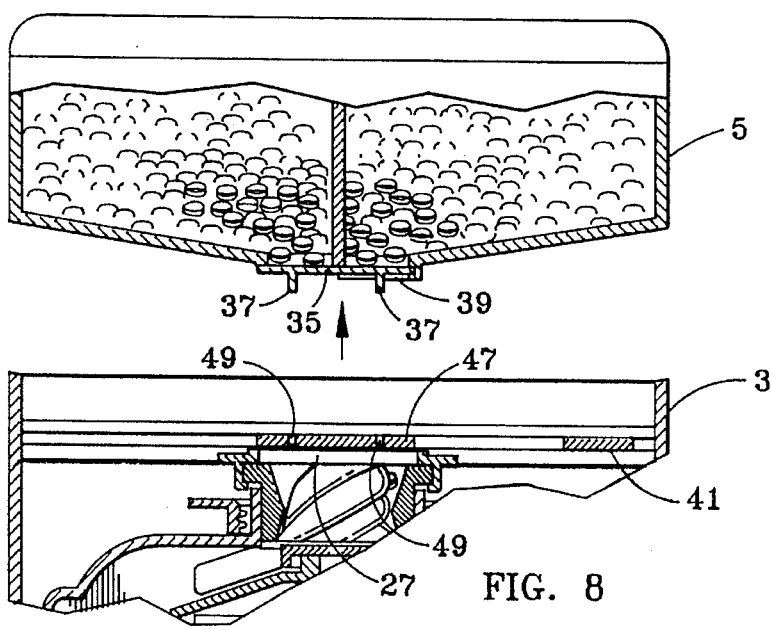
FIG. 8 is similar to FIG. 7, but shows the two bins removed from the grinder. The slider plate is held in position under the bean outlets by a supporting frame, so the beans cannot come out. The baffle plate is now separate from the slider plate and remains with the grinder.
Figure 9:
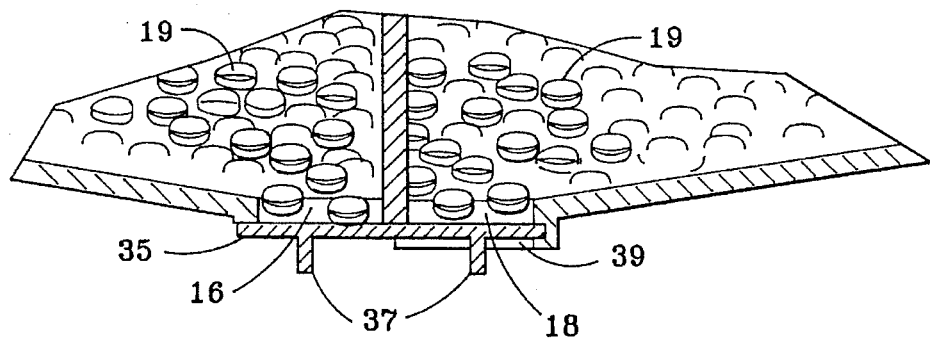
FIG. 9 is a more detailed section showing how the slider plate closes the outlets so that the bins can be removed without beans coming out, and how the slider plate is held in position by a supporting frame.
Figure 10:
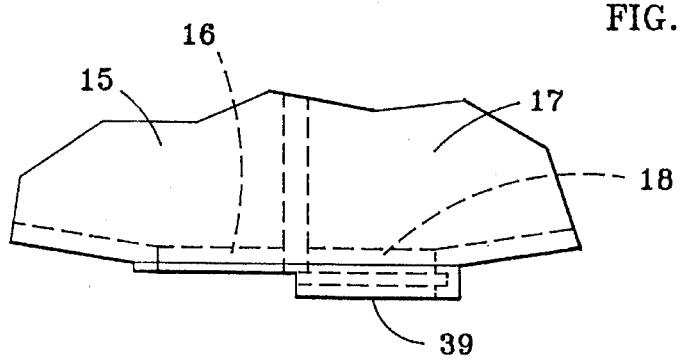
FIG. 10 is a side elevation of the outlets of the two coffee bins showing the supporting frame for holding the slider plate in a position closing the outlets. The supporting frame is mounted just below and around three sides of the outlet of bin "B".
Figure 11:
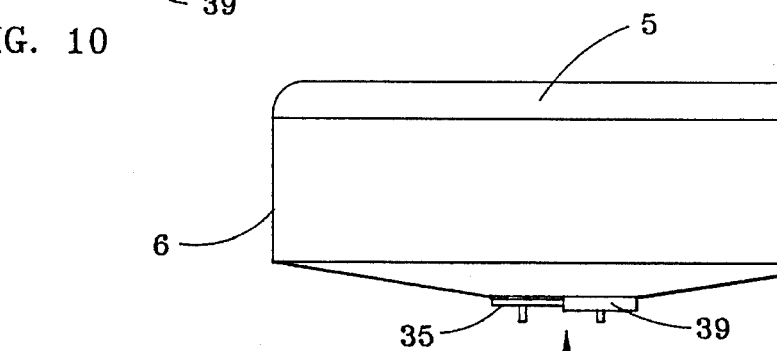
FIG. 11 is a side elevation of the coffee mill with the bins and upper housing removed from the grinder and the lower housing.
Figure 11:
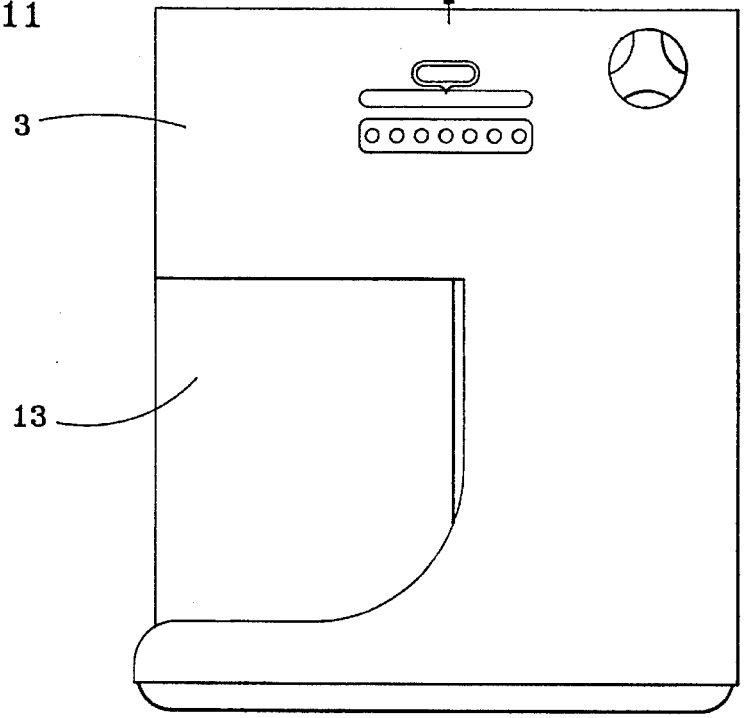

In FIG. 6, slider plate 35 is blocking neither outlet; and the opening 43 in baffle plate 41 is exposing only about a third of outlet 18. The result will be a proportion of A beans to B beans of about 3:1.

Other degrees of mixture can be obtained in a similar manner, running from 0% A and 100% B to 100% A and 0% B.

When one desires to remove the bins from the coffee mill, this can be done without the coffee beans spilling out the bin openings 16 and 18. The user simply moves blend control arm 7 to the right (as seen in the drawings); and the baffle plate 41 and slider plate 35 will move to the right, so that the slider plate covers the bin openings, and the slide plate support portion 47 of the baffle plate 41 covers the entrance opening 27 of grinder 25. With this movement to the right, the slider plate will also enter the slider plate supporting frame 39, where it will be held against the outlets 16 and 18. Upper housing 5 is then lifted, causing the tabs 37 of slider plate 35 to lift out of slots 49 in baffle plate 41. This leaves baffle plate 41 over grinder entrance opening 27, while the slider plate 35 travels with the bins 15 an 17 and keeps them closed. The procedure is reversed to replace the bins.

We claim:

1. A coffee mill capable of blending varying proportions of coffee beans prior to grinding, said coffee mill including, first and second coffee bean bins having first and second bin outlets, respectively, said outlets being proximate to one another, a coffee grinder having a coffee bean entrance, said entrance being positioned below said bin outlets, to receive coffee beans therefrom, a slider plate and a baffle plate mounted for joint unitary longitudinal sliding motion as a unit between said bin outlets and said coffee bean entrance, said plates together serving to cover varying potions of said outlets when slidingly moved relative to said outlets, whereby the relative proportion of beans flowing from said outlets to said entrance can be varied by sliding said slider plate and said baffle plate.

2. A coffee mill capable of blending varying proportions of coffee beans prior to grinding, said coffee mill including, first and second coffee bean bins having first and second bin outlets, respectively, said outlets being proximate to one another, a coffee grinder having a coffee bean entrance, said entrance being positioned below said bin outlets, to receive coffee beans therefrom, a slider plate and a baffle plate mounted for unitary sliding motion between said bin outlets and said coffee bean entrance, said slider plate being above said baffle plate, said plates together serving to cover varying portions of said outlets when slidingly moved relative to said outlets, and interengaging means removably interengaging said slider plate and said baffle plate, whereby the relative proportion of beans flowing from said outlets to said entrance can be varied by sliding said slider plate and said baffle plate.

3. A coffee mill as set forth in claim 2 in which said slider plate has a lower surface and said baffle plate has an upper surface, and said interengaging means includes tabs downwardly extending from said lower surface and complementary receiving slots in said upper surface.

4. A coffee mill capable of blending varying proportions of coffee beans prior to grinding, said coffee mill including, first and second coffee bean bins having first and second bin outlets, respectively, said outlets being proximate to one another, a coffee grinder having a coffee bean entrance, said entrance being positioned below said bin outlets, to receive coffee beans therefrom, a slider plate and a baffle plate mounted for unitary sliding motion between said bin outlets and said coffee bean entrance, said baffle plate including a slider plate support, a gate portion, and an opening therebetween, and including interengaging means removably mounting said slider plate on said slider plate support, said plates together serving to cover varying portions of said outlets when slidingly moved relative to said outlets, whereby the relative proportion of beans flowing from said outlets to said entrance can be varied by sliding said slider plate and said baffle plate.

5. A coffee mill as set forth in claim 4 in which said interengaging means includes extending tabs on said slider plate or said baffle plate and complementary tab-receiving slots on the other of said plates.

6. A coffee mill, said coffee mill including, first and second coffee bean bins having first and second bin outlets, respectively, said outlets being proximate to one another, a coffee grinder having a coffee bean entrance, said entrance being positioned below said bin outlets, to receive coffee beans therefrom, a slider plate and a baffle plate mounted for unitary sliding motion between said bin outlets and said coffee bean entrance, said slider and baffle plates being releasable from one another and together serving to cover varying portions of said outlets when slidingly moved relative to said outlets, and a supporting frame to receive and hold said slider plate, said supporting frame being mounted adjacent to at least one of said outlets, whereby said slider plate can be held by said supporting frame and serve to close said outlets when it is desirable to remove said coffee bean bins from said coffee mill.

7. A coffee mill as set forth in claim 6 in which said slider plate and said baffle plate together serve to cover varying portions of said outlets when slidingly moved relative to said outlets.

8. A coffee mill as set forth in claim 6 in which said sliding plate and said baffle plate release from one another when said coffee bean bins are removed from said coffee mill.

9. A coffee mill, said coffee mill including, first and second coffee bean bins having first and second bin outlets, respectively, said outlets being proximate to one another, a coffee grinder having a coffee bean entrance, said entrance being positioned below said bin outlets, to receive coffee beans therefrom, a slider plate mounted for unitary longitudinal sliding motion between said bin outlets and said coffee bean entrance, a slider plate support frame mounted proximate to one of said outlets to hold said slider plate in a position to cover said first and second bin outlets, and sliding means for sliding said slider plate into said slider support frame, said slider plate serving to close said first and second coffee bin outlets when said coffee bins are removed from said coffee mill.

10. A coffee mill, said coffee mill including, first and second coffee bean bins having first and second bin outlets, respectively, said outlets being proximate to one another, a coffee grinder having a coffee bean entrance, said entrance being positioned below said bin outlets, to receive coffee beans therefrom, a slider plate mounted for unitary sliding motion between said bin outlets and said coffee bean entrance, a slider plate support frame mounted proximate to one of said outlets to hold said slider plate in a position to cover said first and second bin outlets, and sliding means for sliding said slider plate into said slider support frame, said sliding means being a baffle plate releasably interengaged with said slider plate and a cradle to slidingly carry said baffle plate proximate to and above said coffee bean entrance, whereby said slider plate serves to close said first and second coffee bin outlets when said coffee bins are removed from said coffee mill.

* * * * *